United States Patent
Iyer et al.

(10) Patent No.: US 7,802,057 B2
(45) Date of Patent: Sep. 21, 2010

(54) PRIORITY AWARE SELECTIVE CACHE ALLOCATION

(75) Inventors: Ravishankar Iyer, Portland, OR (US); Ramesh Milekal, Portland, OR (US); Donald Newell, Portland, OR (US); Li Zhao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 11/965,131

(22) Filed: Dec. 27, 2007

(65) Prior Publication Data

US 2009/0172315 A1 Jul. 2, 2009

(51) Int. Cl.
*G06F 12/06* (2006.01)
*G06F 9/50* (2006.01)
(52) U.S. Cl. .................. 711/136; 711/133; 718/103
(58) Field of Classification Search .................. None
See application file for complete search history.

(56) References Cited

U.S. PATENT DOCUMENTS

| 2005/0114605 A1* | 5/2005 | Iyer ........................... 711/133 |
| 2008/0235487 A1* | 9/2008 | Illikkal et al. ............... 711/207 |
| 2008/0250415 A1* | 10/2008 | Illikkal et al. ............... 718/103 |

* cited by examiner

*Primary Examiner*—Than Nguyen
(74) *Attorney, Agent, or Firm*—David P. McAbee (57) ABSTRACT

A method and apparatus for is herein described providing priority aware and consumption guided dynamic probabilistic allocation for a cache memory. Utilization of a sample size of a cache memory is measured for each priority level of a computer system. Allocation probabilities for each priority level are updated based on the measured consumption/utilization, i.e. allocation is reduced for priority levels consuming too much of the cache and allocation is increased for priority levels consuming too little of the cache. In response to an allocation request, it is assigned a priority level. An allocation probability associated with the priority level is compared with a randomly generated number. If the number is less than the allocation probability, then a fill to the cache is performed normally. In contrast, a spatially or temporally limited fill is performed if the random number is greater than the allocation probability.

28 Claims, 5 Drawing Sheets

PRIORITY AWARE SELECTIVE CACHE ALLOCATION

FIELD

This invention relates to the field of hierarchal memory in computer systems and, in particular, processing of cache allocation requests based on priority and cache capacity utilization.

BACKGROUND

Typically, cache includes memory between a shared system memory and execution units of a processor to hold information in a closer proximity to the execution units of the processor. In addition, cache is typically smaller in size than a shared main system memory, which allows for more expensive faster memory, such as Static Random Access Memory (SRAM). Both the proximity to the execution units and the speed allow for caches to provide faster access to data and instructions. Caches are often identified based on their proximity from execution units of a processor. For example, a first-level (L1) cache may be close to execution units residing on the same physical processor. Due to the proximity and placement, first level cache is often the smallest and quickest cache. A computer system may also hold higher-level or further out caches, such as a second level cache, which may also reside on the processor but be placed between the first level cache and main memory, and a third level cache, which may be placed on the processor or elsewhere in the computer system, such as at a controller hub, between the second level cache and main memory.

When a processor requests an element, such as a data operand or instruction, from memory, the cache is checked first to see if the element resides in the cache and may be provided quickly to execution units without waiting to fetch the element from main memory. Currently, caches are typically unaware of how cache lines are allocated to multiple incoming application streams. When a processor issues a load/store request for a data block in a cache, for example, the processor only checks for the data block in the cache. That is, if the data block is not in the cache, the cache controller issues a request to the main memory. Upon receiving a response from the main memory, the cache controller allocates the data block into the cache. Often, selection of a cache line to replace with the newly retrieved block of data is based on a time or use algorithm, such as a Last Recently Used (LRU) cache replacement algorithm.

In processor systems employing multi-threaded cores, multi-core processors, multi-tasked cores, and/or virtualized cores, multiple incoming application streams may interfere with each other and as a result, may cause a shared cache to operate inefficiently. For example, a low priority incoming application stream may be associated with a lower priority level then a priority of a higher priority application stream. However, the low priority incoming stream may provide more allocation requests, which potentially monopolizes the cache, i.e. evicts lines associated with the high priority application stream, which may degrade the performance of the high priority application stream.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific allocation probabilities, specific cache line replacement algorithms, specific numbers of priority classes, specific control software, specific sampling percentages, etc. in order to provide a thorough understanding of the present invention. It will be apparent, however, to one skilled in the art that these specific details need not be employed to practice the present invention. In other instances, well known components or methods, such as cache control and replacement logic, virtual memory and address translation, processor architecture, and other specific operation details, have not been described in detail in order to avoid unnecessarily obscuring the present invention.

The method and apparatus described herein are for providing Quality of Service (QoS) through priority-aware selective cache allocation. Specifically, priority-aware selective cache allocation is primarily discussed in reference to traditional set based cache memories. However, the methods and apparatus for priority aware selective cache allocation are not so limited, as they may be implemented on or in association with any known cache memory and/or computer system.

Figure 1:
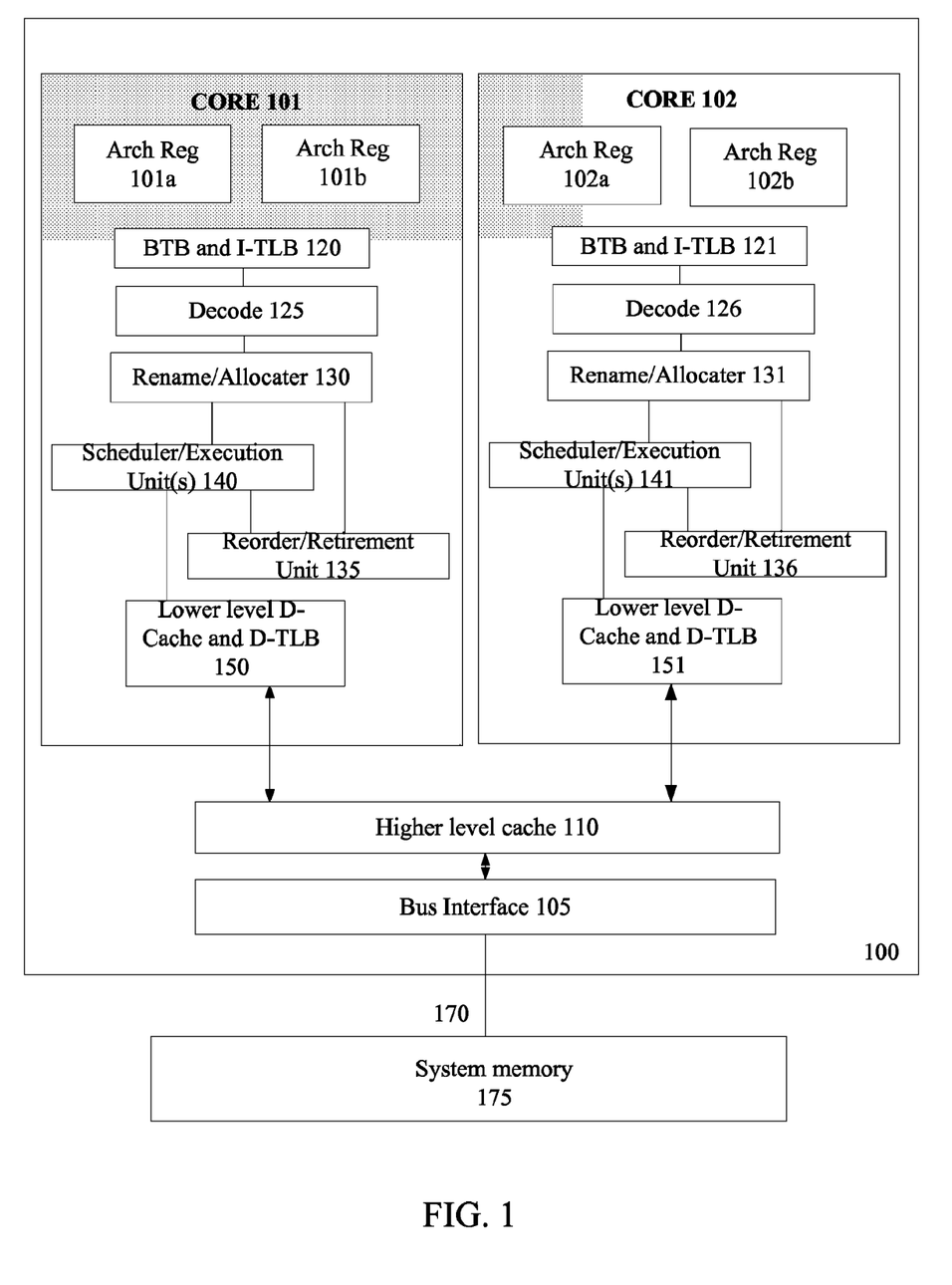
FIG. 1 illustrates an embodiment a processor including cache memories capable of dynamic priority aware consumption guided probabilistic cache allocation.

Referring to FIG. 1, an embodiment of a multi-processing element processor including a cache capable of providing QoS for different priority level application streams through priority aware consumption guided probabilistic cache allocation illustrated. A processing element refers to a thread, a process, a context, a logical processor, a hardware thread, a core, and/or any processing element, which utilizes resources of the processor, such as reservation units, execution units, pipelines, and/or higher level caches/memory. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources.

Physical processor 100, as illustrated in FIG. 1, includes two cores, core 101 and 102, which share access to higher level cache 110. In addition, core 101 includes two hardware threads 101a and 101b, while core 102 includes two hardware threads 102a and 102b. Therefore, software entities, such as an operating system, potentially view processor 100 as four separate processors, while processor 100 is capable of executing four software threads.

As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned elements capable of maintaining a context, such as cores, threads, hardware threads, virtual machines, or other resources.

In one embodiment, processor 100 is a multi-core processor capable of executing multiple threads in parallel. Here, a first thread is associated with architecture state registers 101a, a second thread is associated with architecture state registers 101b, a third thread is associated with architecture state registers 102a, and a fourth thread is associated with architecture state registers 102b. Reference to processing elements in processor 100, in one embodiment, includes reference to cores 101 and 102, as well as threads 101a, 101b, 102a, and 102b. In another embodiment, a processing element refers to elements at the same level in a hierarchy of processing domain. For example, core 101 and 102 are in the same domain level, and threads 101a, 101b, 102a, and 102b are in the same domain level, as they are all included within a core's domain.

Although processor 100 may include asymmetric cores, i.e. cores with different configurations, functional units, and/or logic, symmetric cores are illustrated. As a result, core 102, which is illustrated as identical to core 101, will not be discussed in detail to avoid obscuring the discussion.

As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Bus interface module 105 is to communicate with devices external to processor 100, such as system memory 175, a chipset, a northbridge, or other integrated circuit. Memory 175 may be dedicated to processor 100 or shared with other devices in a system. Examples of memory 175 includes dynamic random access memory (DRAM), static RAM (SRAM), non-volatile memory (NV memory), and long-term storage. Typically bus interface unit 105 includes input/output (I/O) buffers to transmit and receive bus signals on interconnect 170, such as a parallel bus, a serial bus, a differential bus, a cache coherent bus, or other known interconnect implementing any known bus protocol.

Higher-level or further-out cache 110 is to cache recently fetched and/or operated on elements. Note that higher-level or further-out refers to cache levels increasing or getting further way from the execution unit(s). In one embodiment, higher-level cache 110 is a second-level data cache. However, higher level cache 110 is not so limited, as it may be or include an instruction cache, which may also be referred to as a trace cache. A trace cache may instead be coupled after decoder 125 to store recently decode traces. Any level of cache may implement the dynamic consumption guided probabilistic allocation policy described herein, such as higher level cache 110, which may be a level two or level three cache, and other caches, such as a first level cache described below and an off-chip cache.

Module 120 potentially includes a branch target buffer to predict branches to be executed/taken and an instruction-translation buffer (I-TLB) to store address translation entries for instructions. Here, a processor capable of speculative execution potentially prefetches and speculatively executes predicted branches. Decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. In fact, instructions/operations are potentially scheduled on execution units according to their type availability. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states, such as modified, exclusive, shared, and invalid (MESI) states. The D-TLB is to store recent virtual/linear to physical address translations. As a specific example, a processor may include a page table structure to break physical memory into a plurality of virtual pages. As stated above, a first level cache may implement the dynamic consumption guided probabilistic allocation policy as described herein.

Processor 100, as illustrated is capable of executing at least four threads in parallel. As a result, a cache, such cache 110, may receive cache allocation requests from four different application streams associated with any number of priority levels. Therefore, incoming cache allocation requests are assigned a priority based on the nature and/or source of the request. Control logic of the cache probabilistically determines whether the cache allocation request should be filled normally or on a limited basis based on priority. In one embodiment, the probabilistic determination is aware of consumption of priority levels of a cache. Here, consumption of a cache for a priority level is monitored, and the allocation probability for a priority level is potentially varied based on the monitored consumption. As a result, probabilistic allocation based on actual consumption of a cache may be performed to ensure Quality of Service for higher priority applications/threads.

The processor architecture described above is purely illustrative to depict an exemplary memory hierarchy including multiple levels of cache memories and a system memory. However, any processor architecture, cache architecture, or memory hierarchy may be utilized when implementing priority level aware consumption guided probabilistic cache allocation, as described herein.

Figure 2:
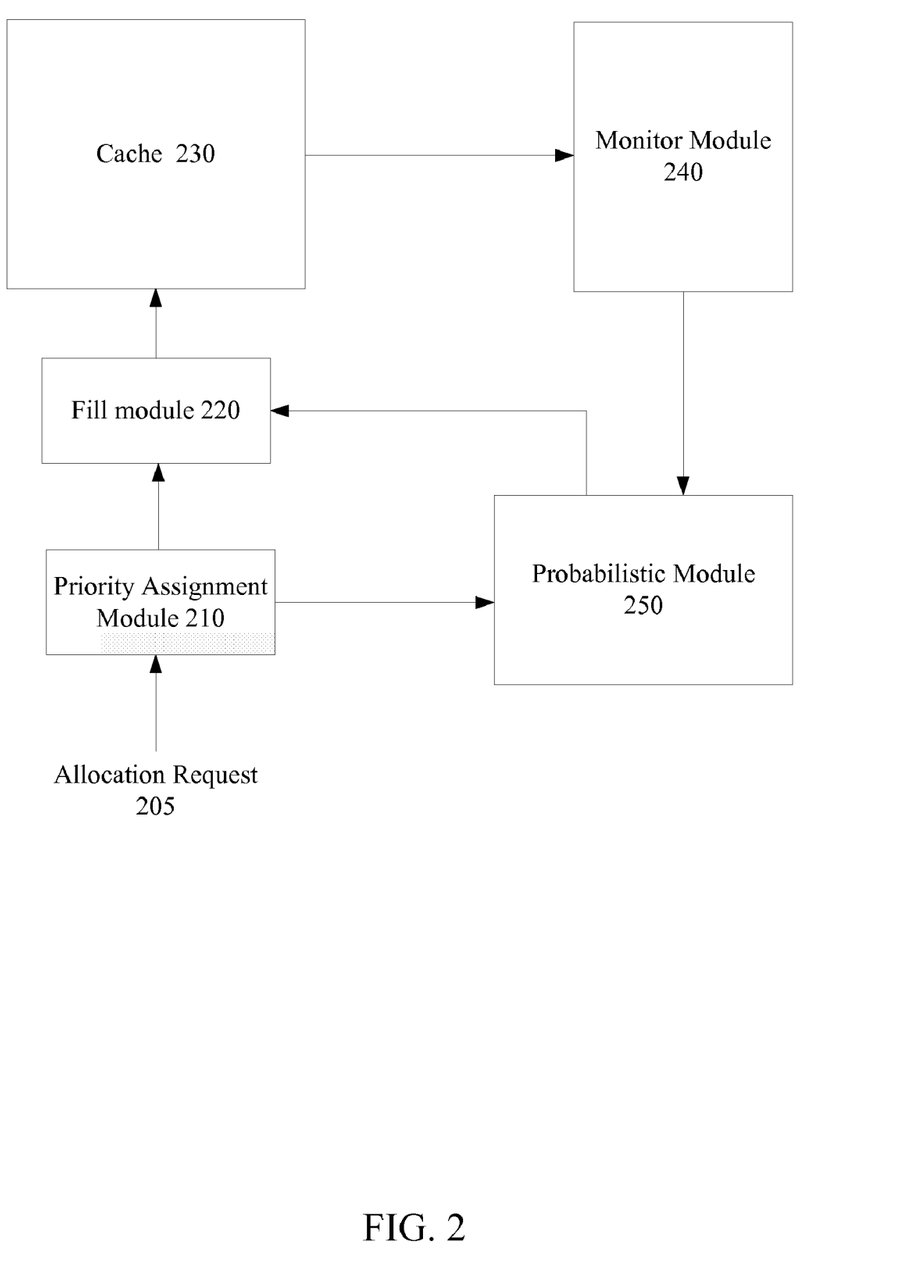
FIG. 2 illustrates an embodiment of a cache capable of dynamic priority aware consumption guided probabilistic allocation.

Turning to FIG. 2, an embodiment of a cache including a cache memory and cache control to implement a priority aware dynamic consumption guided probabilistic allocation policy is illustrated. Cache memory 230 may be any cache memory, such as a first level, second level, third level, or last level instruction or data cache. Many different cache organizations are utilized today. For example, a set associative cache includes a memory having a number of lines which are logically viewed as a number of sets, each set including a line of the same offset within each way of the memory. Therefore, an 8-way set associative cache includes any number of sets, such as $2^n$ sets, having eight lines within each set. Consequently, use of the term blocks in regards to a cache memory may be viewed as lines, i.e. blocks of data or multiple data, sets, i.e. blocks of lines from each way, or as ways, i.e. blocks of lines from each set.

Although not specifically illustrated, often a cache memory includes many different units/modules. For example, a typical cache memory may include a data array, a tag array, control logic, and other logic/units. Therefore, cache 230, in one embodiment, includes the data and/or tag array, while modules 210, 220, 240, and 250 are included within the nomenclature of control or cache control logic/modules.

Priority assignment module 210 is illustrated in FIG. 2 as receiving incoming cache allocation request 205. A cache allocation request is often generated in response to a memory access that results in a miss to the cache. In response to the miss, a data block is fetched from main memory and probabilistically filled in the cache as described below. Priority assignment module 210, in one embodiment, is to assign a priority level to cache allocation requests 205, which may be from any number of application streams having any number of priority levels. For example, in a system with four priority levels, P0, P1, P2, and P3, with P0 being the highest priority and P3 being the lowest priority, priority assignment module 210 assigns any one of the four priority levels to allocation request 205.

Priority assignment module 210 may be implemented in hardware, software, firmware, or a combination thereof. For example, priority assignment unit 210 is implemented using some controlling code/program, such as a hypervisor or an operating system (OS). As a specific illustrative example, the hypervisor or OS assigns a priority level to an application thread running in a processor, such as thread 101a of processor 100 in FIG. 1, based on user-defined parameters. When the application thread issues a memory request or a series of memory requests, the hypervisor or OS assigns a priority to those memory requests as they originate from the application thread assigned the priority.

In an embodiment of combination of hardware and software for priority assignment module 210, an OS or hypervisor assigns an application thread a priority in hardware, such as register specific to a hardware thread or core executing the application thread. Therefore, when a cache allocation request is received from software thread executing on the hardware thread or core, t priority assignment module 210 is able assign the priority level held in the hardware of the core or thread. Note that a priority may also be encoded with the cache allocation request based on a stored priority for a software thread.

In another embodiment, priority assignment module 210 is a compiler that assigns a priority to the application thread or each memory request made by the application thread during compilation of the application thread code. Here, when a memory request is encountered in application code, a priority is associated with the memory request by the compiler. Here, the compiler may encode the priority level in the memory access operation during compilation. In yet another embodiment, priority assignment module 210 may be hardware, such as an application specific integrated circuit (ASIC), register, or other logic to assign a priority level to cache allocation requests 205.

Regardless of the specific manner in which the priority assignment unit 210 is implemented, priority assignment unit 210 assigns the priority level, in one embodiment, based on the nature of cache allocation request 205. For example, the priority assignment unit 210 assigns a higher priority to instructions than data, a higher priority to data loads than data stores, and/or a higher priority to demand requests than prefetches and speculative memory references. However, any hierarchy for the nature of an application stream may be utilized. The priority assignment unit 210 may also assign the priority level based on the cache miss ratio of a particular thread. In other words, the priority assignment unit 210, in one example, maintains a counter to track the number of cache allocation requests and the miss rate for each thread. Based on the counter values, priority assignment unit 210 may assign a higher priority to threads with higher cache allocation request rates, higher cache miss ratios, and/or higher hit ratios.

Further, priority assignment unit 210, in one embodiment, assigns priority level based on the origin of the incoming application streams (i.e., type of the source of the incoming application streams. If the cache 230 is a central processing unit (CPU) cache, for example, priority assignment unit 210 assigns a higher priority to a CPU-initiated cache allocation request than other devices, such as a memory controller and/or a network device that is attempting to send (i.e., push) data into cache 230. Yet, any hierarchy of source for an incoming application stream may be utilized for priority assignment.

In another example where the four priority levels from above (P0, P1, P2, and P3) are available to priority assignment unit 210, priority assignment unit 210 assigns a priority level of P0 (i.e., a highest priority level) to incoming application streams associated with primary host applications such as front-end web service, a priority level of P1 to incoming application streams associated with secondary host applications such as mid-tier workload, a priority level of P2 to incoming application streams associated with peripheral applications such as input/output drivers and/or OS threads, and a priority level of P3 (i.e., a lowest priority level) to incoming application streams associated with other applications such as word processing applications.

Monitor module 240 is to monitor and/or determine the utilization or consumption of cache 230 by the priority levels. In one embodiment, monitor module 240 tracks a percentage utilization of a priority level in cache 230. For example, a number of lines associated with priority level P0, i.e. the highest priority level, is divided by the total number of lines monitored to obtain a percentage of utilization. Note from the discussion above, that a cache may be organized in any manner, such as multiple lines within multiple sets and ways. As a result, other examples of usage may include a number of blocks or a percentage of blocks, which in different embodiments refers to a number of lines, a percentage of sets a number of lines, a percentage of sets, a number of ways, and a percentage of ways.

In one embodiment, a sample portion/group or sample size of the cache is monitor to obtain a statistical representation of the cache. For example, utilization for each priority level of 10% of the blocks of cache 230 is monitored. Continuing the example from above with four priority levels, the utilization for P0-P3 is determined within the 10%. Therefore, if there are 100 lines being monitored and data associated with P0 is held in 90 of the 100 lines, then the cache utilization/consumption is determined to be 90% of the cache. Note that ways of a cache may also be utilized; however, in some embodiments, lines or sets provide better granularity. Here, the logic to track utilization does not have to be as complex, since it is only tracking utilization for a subset of the cache memory, i.e. a sample size. As an illustrative example, the sample size for a cache may be between 1% to 50% of the blocks in the cache, wherein blocks refer to data elements within a cache line, lines, sets, or ways.

Probabilistic module 250 is to assign allocation probabilities to each priority level. In theory, the higher the allocation probability for a priority level, the higher rate of allocation for the priority level. As a result, depending on the implementation, in theory, a higher allocation probability would be assigned to higher priority levels. However, when a lower priority level causes a higher number of allocation requests, even with a lower allocation probability, the lower priority level may utilize more of cache 230. As a result, in one embodiment, probability module 250 is to dynamically adjust allocation probabilities for each of the priority levels based on the consumption monitored by monitor module 240. In other words, the benefits of probabilistic allocation may be realized while ensuring a low priority thread with a high allocation rate does not exceed its assigned cache capacity.

In one embodiment, based on an allocation probability associated with a priority level in probability module 250, it is determined if a normal or limited fill is to be performed. In one embodiment, fill module 220 compares a random generated number to an allocation probability value from module 250 to determine if a normal or limited fill is to be performed. As a simplified example, assume priority assignment module 210 assigns a priority level, such as P2, to allocation request 205. As a result, an allocation probability (AP) in module 250 associated with priority P2 is provided to fill module 220.

Here, the allocation probability represents a value, such as a percentage between 1 and 100. In addition, a random number is generated between 1 and 100. After comparing the AP to the random number, it is determined if a normal fill or a limited fill is to be performed. As an example, if the AP is 60% for P2 and the random number is 50, then a normal fill is performed, i.e. when the random number is less than the AP. In contrast, if the random number is 61, then a limited fill is performed. Note that based on the implementation, the AP number and random number comparison may be inverted. For example, performing normal fills for a random number greater than an AP of 40% is essentially identical to the example above, i.e. for 60 out of 100 numbers a normal fill will be performed and for 40 numbers out of 100 a limited fill will be performed. Furthermore, numbers of 1 through 100 are purely exemplary and may be any values.

The terms normal and limited fill have been used above. A normal fill refers to performing a normal fill operation. As an example, a normal replacement algorithm is utilized to select a line to evict and the line is filled with data based on allocation request 205. A specific illustration of a replacement algorithm includes a Last Recent Used (LRU) algorithm. Previously, a currently pending application entitled, "Methods and Apparatus to Process Cache Allocation Requests Based on Priority," with application Ser. No. 10/722,884 discloses dropping, i.e. not performing, any fill in the opposite of performing a normal fill. However, bypassing a cache, such as a last level cache, is problematic in different cache environments, such as in an inclusive cache environment.

Therefore, in one embodiment, whether in an inclusive or non-inclusive cache environment, a limited fill is performed. A limited fill refers to any known method of limiting a fill to a cache. In one embodiment, a limited fill includes a fill to a line of the cache memory for the cache allocation request without updating a replacement algorithm state of the line. Here, as an example, if an LRU state of the line already indicates that it is next to be evicted, i.e. potentially the reason it was selected for eviction, then the LRU state is not updated upon performing the limited fill. In contrast, a normal fill would update the LRU state, as it was recently placed in the cache. This is an example of temporally limiting a fill to the cache, as it potentially is an early candidate for eviction based on the LRU state not being updated.

In another embodiment, a limited fill includes performing a fill to a line of the cache memory for the cache allocation request and not updating a replacement algorithm in response to a subsequent hit to the line. In the previous example, an LRU state was not updated when the fill was performed. However, if a subsequent hit to the line occurred, the LRU state would be modified, as it was recently used. Yet, in this example, whether the LRU state was modified or not upon the original fill, the LRU state is not modified even when subsequently hit. As a result, even if a low priority thread repeatedly accesses a line that was limitedly filled, the line may be chosen by an LRU algorithm for eviction to ensure the low priority thread does not over utilize the cache.

In yet another embodiment, a limited fill includes filling to a limited portion of cache 230. For example, a smaller number of ways or sets then the total number of ways or sets may be utilized as a filling area for limited fills. To illustrate, assume cache 230 is an 8-way set associative cache. A single way of cache 230 is designated for limited fills. As a result, the single way potentially includes a large number of limited fills contending for space. However, 7-ways of cache 230 are only allocated normally based on AP. As a result, low priority threads with high cache allocation request rates potentially affects the performance of only one way, while the rest of the ways substantially resemble the probabilistic allocation between priority levels.

As stated above, in one embodiment, probabilistic module 240 dynamically changes allocation probabilities based on utilization by the priority levels of cache 230. For example, assume a priority level of P2 is associated with a maximum capacity/consumption of 40% for cache 230. In other words, it is determined that application streams with priority level of P2 are targeted to utilize no more than 40% of cache 230. However, assume that P2's cache allocation rate is initially reasonably low. Therefore, an allocation rate of 70% is at that moment associated with P2 in module 250, because even when 70% of the allocation requests are probabilistically filled normally and 30% limitedly, P2 only utilizes about 40% of the cache, i.e. the maximum capacity associated in module 250 from P2.

However, later P2 applications begin generating allocation requests at a higher rate. As a result, when 70% of the fills are normally filled, monitor module 240 tracks that P2 begins to utilize more of cache 230. For example, assume monitor module 240 determines that P2 is now utilizing 60% of the sample lines in cache 230. The 60% utilization is compared to the 40% maximum limit, and it is determined that P2 is consuming too much of cache 230. Consequently, the allocation probability for P2 in module 250, which was previously at 70%, is reduced. For example, it is reduced to 55% to probabilistically perform fewer normal fills and more limited fills. Therefore, the allocation probabilities for priority levels are guided based on consumption of the cache to ensure Quality of Service according to priority level.

Note that more than one Allocation Probability (AP) may be associated with each priority level. For example, different APs may be associated with a priority level based on different time intervals. Discussion of APs per time interval may be found in pending application entitled, "Methods and Apparatus to Process Cache Allocation Requests Based on Priority," with application Ser. No. 10/722,884." Therefore, the multiple APs per priority level may also be dynamically guided by consumption as discussed above.

Figure 3:
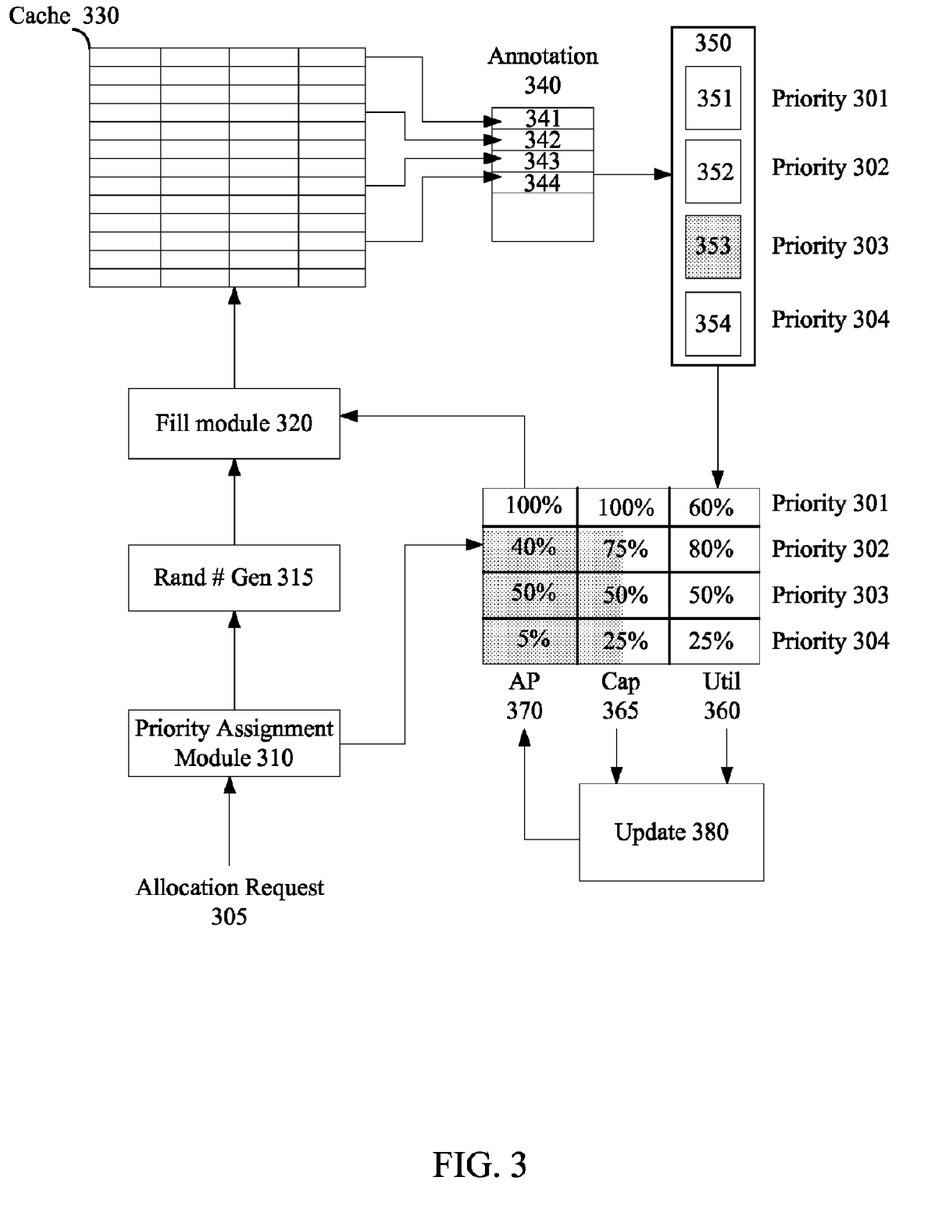
FIG. 3 illustrates another embodiment of a cache capable of dynamic priority aware consumption guided probabilistic allocation.

Turning to FIG. 3 a specific embodiment of modules and logic to ensure Quality of Service (Qos) for a cache through dynamic priority aware consumption guided probabilistic cache allocation is illustrated. Cache 330, as depicted, includes a four way cache with 2" sets. However, any number of ways and sets may be included in cache 330. Here, allocation request 305 is received by priority assignment module 310. Note priority assignment module may include hardware, software, firmware, or a combination thereof. As in one of the examples discussed above, a controlling program, such as a hypervisor or operating system, assigns a thread/application a priority level. This priority level is held in context specific logic. Therefore, upon receiving allocation request 305 from a thread, the priority level assigned to the thread is associated with allocation request 305.

Probability module 355 includes a descriptor table, which may also be referred to as probability or descriptor logic, modules, and/or storage areas. A probability module may also include update logic 380 as described below. Here, descriptor 355 associates Allocation Probability (AP) 370, maximum capacity/consumption 365, and utilization 360 with each priority level. Although, utilization 360 may also be held in counting logic 350. Therefore, a single storage area to hold utilization values 360, in one example, are associated with both descriptor 355 and counting logic 350.

As can be seen, for the highest level priority, i.e. priority 301, maximum capacity/consumption 365 is set to 100%, while priority levels 302, 303, and 304 are associated with decreasing capacity values 365 of 75%, 50%, and 25%, accordingly. Although here, capacity values are set from highest to lowest for the highest to lowest priorities, accordingly, any capacity value may be utilized for any priority level. Maximum capacity/consumption may include a predefined limit. In contrast, hardware, controlling software, or both, in one embodiment, are capable of dynamically changing capacity levels for the different priority levels.

To illustrate exemplary operation within FIG. 3, assume allocation request 305 is associated with priority level 302 by priority assignment module 310. The entry for priority level 302 is indexed into based on priority level 302, and associated AP 370 of 40% for priority level 302 is provided to fill module 320. In addition, a random number between 1 and 100 is generated. Note this number may be generated in any known manner, such as based on a linear feedback shift register. The random number is compared to the AP of 40% in fill module 320. If the random number is less than the AP of 40%, then a normal fill is performed into cache 330. However, if the random number is greater than 40%, then a limited fill to cache 330 is performed.

As described above, a limited fill may entail a fill into cache 330 without updating a replacement algorithm state, a fill into cache 330 without allowing subsequent hits to update the replacement algorithm state, filling into a limited portion of cache 330, such as to only one of the four ways of cache 330, or any other known method of limiting a fill. For example, limiting a fill may be done through spatial constraint the location of a fill, through temporal constraint of how long the fill is to remain in cache, or through other action which constrains a normal fill.

In the illustrated embodiment, annotation logic 340, which also may be referred to as monitor logic, a storage area, or annotation bits, is associated with cache 330. In one embodiment, annotation logic 340 includes an array separate from cache 330, which is associated with blocks, such as lines, sets, or ways, of cache 330. However, annotation 340 may also include bits that reside in lines of cache 330. Here, annotation logic 340 is associated with a sampled portion of lines of cache 330. As described above, annotation logic 340 may be reduced in complexity by monitoring only a sampled portion of sets in cache 330 instead of every line or set, while still obtaining a reasonably accurate utilization map of cache 330.

Here, each field, i.e. fields 341, 342, 343, and 344, of storage area 340 hold representations of priority levels that currently occupy the lines associated with each of the fields. As an extremely oversimplified example, fields 341, 342, 343, and 344 each include two bits to indicate which priority level, i.e. 00 (301), 01 (302), 01 (303), and 11 (304), is currently filled in an associated line. However, fields 341, 342, 343, and 344 may include any number of bits to correspond to any number of lines, sets, or ways. For example, 32 bits may be held in each field to track priority levels for 16 different lines. Also note that the sampled lines may be selected by any method, such as a statistical method to closely approximate the utilization of all of cache 330. In one embodiment, the sampled range is between 1% and 50% of the lines in cache 330.

Note that the lines to be sampled may be predefined and static. However, in another embodiment, sampled lines are dynamically re-assignable. For example, a sample portion includes 10% of cache 330 in a contiguous group of lines, such as a number of consecutive sets and all of their lines. A change to the sampled group of lines may be the position/location of the lines within cache 330, the proximity of the lines to each other, i.e. some no longer contiguous, the number of lines sampled, i.e. from 10% to 5%, or a combination thereof. As a consequence, when sampled lines are altered, fields 341-344 are re-associated with new lines to be sampled.

Based on fields 341, 342, 343, and 344 counting logic 350 including corresponding counters 351, 352, 353, and 354, for each priority level 301, 302, 303, and 304, accordingly, are incremented upon fills of a priority level's line and decremented upon evictions of a priority level's line. Here, this change in priority usage of cache 330 is evidenced in storage logic 340. However, storage logic 340 may not be utilized in a different embodiment, such as where fill module 320 indicates to counting logic 350 what priority level is being filled and eviction logic identifies which priority level is being evicted.

Nevertheless, counting logic 350 determines the utilization of each priority level. As stated above, counters 351, 352, 353, and 354 maintain a count of lines occupied for each priority level. For example, assume cache 330 includes 1000 lines and the sample size, which monitor fields in storage logic 340 monitor, includes 100 of those 1000 lines. Here, counter 352 maintains a count of the number of those 100 lines including data from an application stream associated with priority 302. In one embodiment, the count for each priority level is divided by a total number of sampled lines, i.e. the sampled portion, to obtain a percentage utilization value. Continuing the example, if 80 of the 100 lines include data for priority 302, then the utilization is 80%. However, any utilization value may be used. Note that portions of threads virtual memory space may overlap, and as a result, multiple priority levels potentially share the same data. As can be seen, these utilization values are associated with priority level entries in descriptor 355 along with corresponding APs 370 and capacity values 365.

Update logic 380 compares capacity values 365 to consumption/utilization values 360 for each of the priority levels. If a consumption exceeds the defined capacity limit, i.e. the priority level is exceeding its threshold for usage of the cache, which potentially adversely affects quality of service for other priority levels, then update logic 380 decreases corresponding AP 370 to probabilistically allocate less normal fills for that priority level. In theory, this decreases the consumption of the priority level. This process may be performed recursively until a correct utilization value that matches the capacity value for a priority level is met. Furthermore, AP 370 for a priority level may be increased by update logic 380, if utilization 360 is under capacity 365 for the priority level.

As an example, priority level 302 is associated with a max capacity or consumption limit of 75% in capacity field 365 of priority level 302's entry. However, counting logic 350, and specifically counter 352, through monitoring of a sampled portion, determines that priority level 302 is utilizing 80%. As a result, a current AP of 40% may be reduced to another lower AP, such as 30%, to ensure the consumption of priority level 302 does not exceed its capacity. As a result, when a subsequent allocation request with priority level 302 is received, a random number is generated by logic 315, and fill module 320 compares the random number to the new AP for priority 302 of 30%. If the random number is greater than 30%, then a limited fill is performed, and in theory, the temporal or spatial nature of the fill is limited resulting in potentially lesser utilization of cache 330 by priority level 302.

Note that the implementations of control modules/logic, such as logic 340, 350, 355, 380, 310, 315, and 320, is purely illustrative and dynamic probabilistic allocation based on priority level and consumption of priority levels may be implemented in any known manner of basing allocation of consumption, priority level, and probability. In fact, as alluded to above, in one embodiment, annotation field 340 may be a separate array, may reside in cache 330, and may not be included in a different implementation. Furthermore, multiple allocation probabilities and capacities may be provided for each priority level based on other factors, such as time, sub priority levels, or other per priority level factors.

Figure 4:
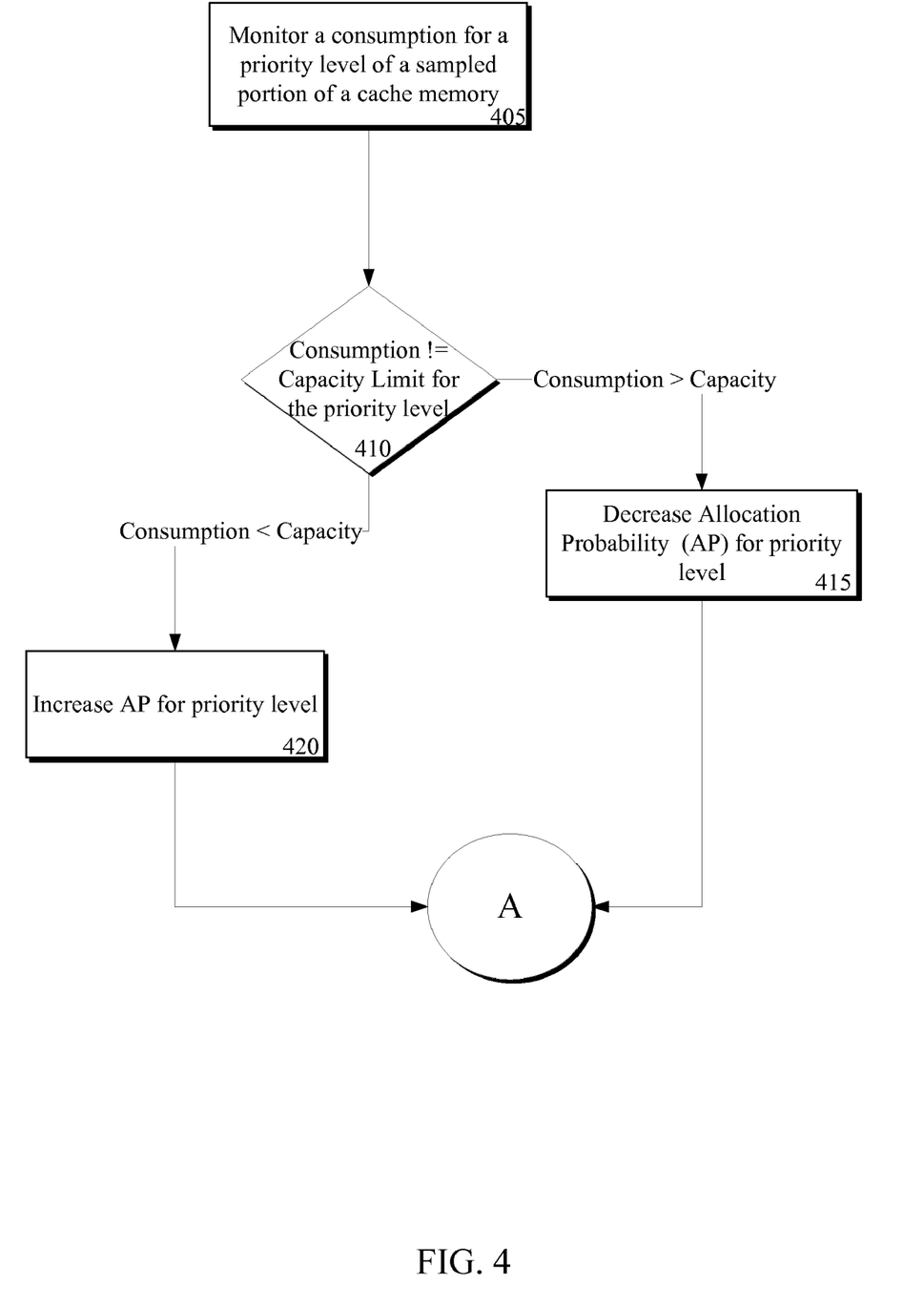
FIG. 4 illustrates an embodiment of a flow diagram for a method of monitoring consumption of priority levels for a sample portion of a cache.
Figure 5:
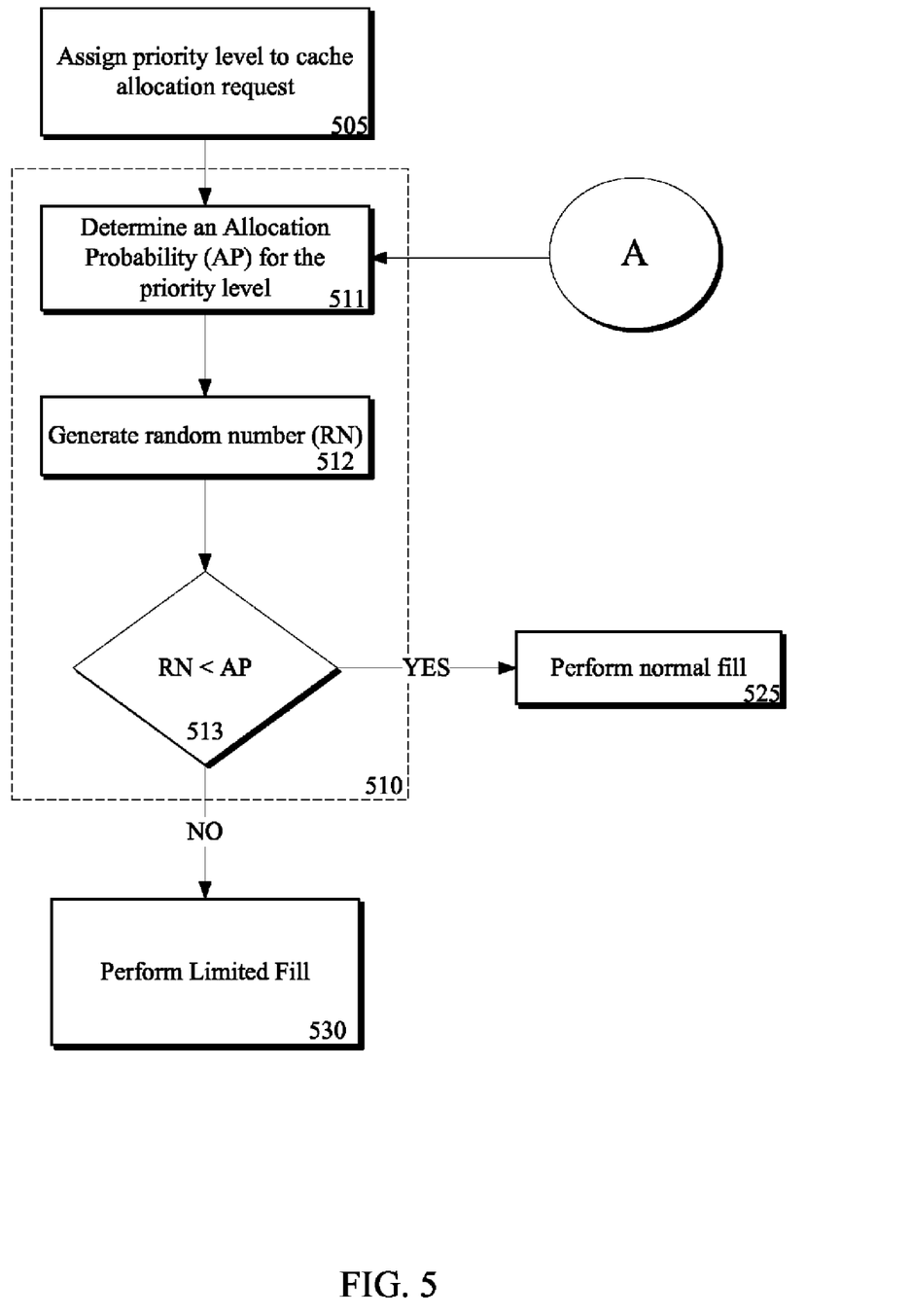
FIG. 5 illustrates an embodiment of a flow diagram for a method of dynamic priority aware consumption guided probabilistic allocation.

Referring next to FIG. 4 an embodiment of a flow diagram for monitoring consumption of a cache for a priority level and dynamically updating an allocation probability based on the priority level is illustrated. Note that the flows in FIGS. 4 and 5 are illustrated in a substantially serial manner. However, any of the flows may be performed fully or partially in parallel. For example, flow 512, i.e. generating a random number, may be performed in parallel to flow 511, i.e. determining an Allocation Probability (AP) for a priority level. Furthermore, the specific order of the flows is purely illustrative. Continuing the example from above, flow 512 may take place before flow 511. Also note that a compiler may insert instructions, calls, operations, functions, or other software constructs into code during compilation, the code, when executed, may be to perform any of the illustrated flows.

In flow 405 a consumption for a priority level of a sampled portion of a cache is monitored/determined. Here, a sampled portion refers to a smaller portion of a cache. For example, a sampled portion includes between 1% and 50% of a number of lines, sets, or ways in a cache. In one embodiment, logic, such as counter logic, is utilized to determine utilization/consumption for a priority level of the cache. As an illustration, a counter is included for each priority level, which is incremented for each line of a sampled of portion of lines associated with the priority level. Furthermore, to extrapolate the utilization within a sampled portion to the whole cache, a utilization or consumption may include a percentage. Continuing the example, the number of lines currently associated with a priority level is divided by a total number of lines to obtain a percentage value. This percentage value may be treated as a consumption/utilization value for the whole cache.

In flows 410-420, an allocation probability based on the consumption of the cache memory and a consumption limit associated with the priority level is updated. In flow 410 it if a consumption/utilization for a priority level exceeds a capacity limit for the priority level. As an example, descriptor logic associates a priority level with a capacity limit. Note the capacity limit may be a predefined capacity value or a dynamically updated capacity value. The utilization value determined above for a priority level is compared to the capacity limit. In one embodiment, compare logic is utilized to compare the values. Here, if the consumption value is greater than the capacity limit, i.e. the consumption of the priority level exceeds its threshold, then an Allocation Probability (AP) associated with the priority level is decreased. In contrast, if the consumption is less than the capacity, the AP may be increased.

In the alternative, APs may be inverted, i.e. instead of a 30% AP and AP of 70% is used. Here, instead of performing a normal fill for a random number under the AP (30%), a normal fill is performed for a random number above the AP (70%). As can be seen, the different implementations achieve the same result, i.e. for 29 random numbers a normal fill is performed and for 69 random numbers a limited fill is performed. Also note that, in one embodiment, some level of buffering may be utilized around the capacity value. For example, two capacity values may be utilized to define an acceptable range of utilization. In other words, a buffer zone around a capacity limit may be used, so the AP is not changing so often that the fluctuation becomes problematic.

Turning next to FIG. 5, an embodiment of a flow diagram for a method of dynamic priority aware probabilistic cache allocation is depicted. In flow 505, a priority level for a cache allocation request is assigned. Examples of factors for assigning a priority level include a source of the allocation request, a nature of the allocation request, an application associated with the allocation request, a compiler hint for the allocation request, a software defined priority for the allocation request or other known factor for determining priority for an application or task in a computer system.

Furthermore, determining the priority level associated with an application or cache request may be performed in hardware, software, firmware, microcode, or a combination thereof. To illustrate, priority held in hardware for a context, thread, or core may be assigned to a cache allocation request associated with the context, thread, or core. As another example, a compiler may determine a priority for memory access requests and hardware is able to decode or recognize the priority to associate with the allocation request. Furthermore, a controlling program such as a hypervisor, i.e. virtual monitor, or operating system may determine priority.

As illustrated by the outlined flow 510, it is probabilistically determined that a limited fill is to be performed based on an allocation probability (AP). In one embodiment, an AP is determined for the priority level assigned to the cache allocation request from flow 505. In one example, the AP is static and determined from logic associating the AP with the priority level for the cache allocation request. In contrast, in the embodiment, shown, an AP is determined from logic associating a dynamically updated AP with the priority level. For example, the AP is dynamically updated in response to cache utilization as described in the flow of FIG. 4, as illustrated through continuation flow A in FIGS. 4 and 5. As an example, the updated AP is held in descriptor logic associating the AP with the priority level for the cache allocation request.

A random value or number is generated in flow 512. For example, if the AP value is between 1 to 100, such as a percentage value, then the random number is generated between 1 and 100. However, the AP and random number do not have to be within the same range, and may include any set/range of numbers.

In flow 513 the random number is compared to the AP as updated in FIG. 4. In this example, if the random number is less than the AP, then a normal fill to the cache is performed for the cache allocation request. To illustrate, the fetched data is placed in a line of the cache and a Last Recently Used (LRU) state is updated according to the normal algorithm. Alternatively, if the random number is greater than the AP, then a limited fill is performed. As discussed above, a limited fill includes any fill of the cache, which is spatially, temporally, or otherwise limited or less than a normal fill. In another alternative, the fill may be dropped, which is in direct contrast with a limited fill, as a drop of an allocation request does not result in any fill.

Note, that any probabilistic implementation may be utilized. For example, if a random number is below a first AP, such as 30, for a priority level then a normal filled is performed. Moreover, if that random number is above the first AP of 30 and below a second AP, such as 70, for the priority level then a limited fill is performed. Here, if the random number is over the AP of 70 it may be dropped.

As can be seen from above, probabilistic allocation/selection in a cache may be utilized to enforce Quality of Service for multiple threads sharing a cache. Furthermore, by making the probabilistic allocation priority aware, better service may be provided to more important applications. However, in certain cache implementations, it may be difficult to drop allocation requests. As a result, in one example, either a normal or limited fill is performed based on the probabilistic allocation. Yet, pure probabilistic implementation potentially still allows for low priority threads to adversely affect performance, as probabilistic allocation in itself only allocates based on probability, not actual allocation rate or consumption. Therefore, consumption may be monitored and probabilities may be dynamically altered to ensure correct QoS for different priority levels. In one embodiment, monitoring is performed on a sample size of a cache memory to reduce monitor logic complexity, while still retaining statistical utilization accuracy for the entire cache memory.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
 a cache memory logically organized into a number of blocks;
 monitor logic coupled to the cache memory to monitor a utilization for a plurality of priority levels within a sample portion of the number of blocks; and
 probability logic coupled to the monitor logic to dynamically adjust a plurality of allocation probabilities associated with the plurality of priority levels based on the utilization for the plurality of priority levels within a sample portion the number of blocks.

2. The apparatus of claim 1, wherein the monitor logic comprises: counting logic associated with each of the plurality of priority levels to track the utilization for the plurality of priority levels within the sample portion of the number of blocks.

3. The apparatus of claim 2, wherein the monitor logic further comprises: a storage area associated with each of the blocks within the sample portion of the number of blocks to indicate a current priority level of the plurality of priority levels utilizing each of the blocks.

4. The apparatus of claim 3, wherein the sample portion of the number of blocks is capable of being dynamically re-assigned to a different sample portion of the number of blocks, and the storage area associated with each of the blocks is also capable of being re-assigned to be associated with the different sample portion of the number of blocks.

5. The apparatus of claim 1, wherein the probability logic comprises a descriptor storage area coupled to the monitor logic to associate the plurality of allocation probabilities with the plurality of priority levels.

6. The apparatus of claim 5, wherein the descriptor storage area includes an entry to associate an allocation probability of the plurality of allocation probabilities with a priority level of the plurality of priority levels, a predefined capacity utilization for the priority level, and the utilization for the priority level.

7. The apparatus of claim 6, wherein the probability logic comprises:
 comparison logic coupled to the storage area to compare the utilization for the priority level to the predefined capacity utilization for the priority level; and
 update logic coupled to the comparison logic and to the storage area to dynamically adjust the allocation probability based on the comparison logic comparing the utilization for the priority level to the predefined capacity utilization for the priority level.

8. The apparatus of claim 7, wherein update logic coupled to the comparison logic and the storage area to dynamically adjust the allocation probability based on the comparison logic comparing the utilization for the priority level to the predefined capacity utilization for the priority level comprises the update logic to increase the allocation probability in response to the utilization for the priority level being less than the predefined capacity utilization for the priority level, and the update logic to decrease the allocation probability in response to the utilization for the priority level being greater than the predefined capacity utilization for the priority level.

9. The apparatus of claim 1, further comprising
 priority assignment logic to assign one of the plurality of priority levels to an incoming cache allocation request;
 number generation logic to generate a comparison number;
 comparison logic coupled to the number generation logic and the probability logic to determine if the comparison number is greater than an allocation probability of the plurality of allocation probabilities, which is associated with the one of the plurality of priority levels assigned to the incoming cache allocation request; and
 control logic to perform a limited fill of the incoming allocation request in response to the comparison number being greater than the allocation probability.

10. An apparatus comprising:
 a cache memory;
 a priority module to assign a priority level to a cache allocation request; and
 a control module to determine an allocation probability associated with the priority level assigned to the cache allocation request, to probabilistically determine if a limited fill for the cache allocation request is to be performed based on the allocation probability, and to perform the limited fill in response to determining the limited fill is to be performed.

11. The apparatus of claim 10, wherein the control module to perform the limited fill comprises the control module to perform a fill to a line of the cache memory for the cache allocation request without updating a replacement algorithm state of the line.

12. The apparatus of claim 10, wherein the control module to perform the limited fill comprises the control module to perform a fill to a line of the cache memory for the cache allocation request and to not update a replacement algorithm in response to a subsequent hit to the line.

13. The apparatus of claim 10, wherein the control module to perform the limited fill comprises the control module to perform a fill to a limited portion of the cache memory.

14. The apparatus of claim 10, wherein the control module to probabilistically determine if a limited fill for the cache allocation request is to be performed based on the allocation probability comprises the cache control logic to compare a random generated number to the allocation probability, to determine the limited fill is to be performed in response to the random generated number being greater than the allocation probability, and to determine a normal fill is to be performed in response to the random generated number being less than the allocation probability.

15. The apparatus of claim 14, wherein the cache control module includes descriptor logic to associate the allocation probability with the priority level.

16. The apparatus of claim 15, wherein the descriptor logic is further to associate a maximum capacity and a current utilization of the cache memory with the allocation probability and the priority level.

17. The apparatus of claim 16, further comprising a monitor module to monitor the current utilization of the cache memory and an update module to dynamically update the allocation probability based on the current utilization and the maximum capacity.

18. A system comprising:
 a processor including a cache memory logically organized into a number of blocks, a priority assignment module to assign a priority level to an incoming cache allocation request for the cache memory, a monitor module to determine a utilization value for a priority level within a sample portion of the number of blocks; a descriptor module to associate the priority level with an allocation probability value, a capacity value, and the utilization value; an update module to update the allocation probability value based on the capacity value and the utilization value; and a fill module to perform a limited fill for the incoming allocation request based on the allocation probability value; and
 a memory coupled to the processor to hold a data block associated with the incoming cache allocation request.

19. The system of claim 18, wherein the sample portion include between one and fifty percent of the number of blocks.

20. The system of claim 18, wherein the cache memory is a last level cache memory in the processor.

21. The system of claim 18, wherein the fill module to perform a limited fill for the incoming allocation request comprises the fill module performing a limited fill action selected from the group consisting of not updating a Last Recently Used (LRU) state of a line of the cache memory upon filling the line, not updating a LRU state of a line of the cache memory upon a subsequent hit to the line of the cache memory, and performing a fill to a limited portion of the cache memory.

22. The system of claim 18, an update module to update the allocation probability value based on the capacity value and the utilization value comprises the update module to determine if the utilization value is greater than the capacity value, to decrease the allocation probability value in response to the utilization value being greater than the capacity value, and to increase the allocation probability value in response to utilization value being less than the capacity value.

23. The system of claim 18, a fill module to perform a limited fill for the incoming allocation request based on the allocation probability value comprises the fill module to generate a random value, to determine if the random value is greater than the allocation probability value, to perform the limited fill for the incoming allocation request in response to the random value being greater than the allocation probability value, and to perform a normal fill for the incoming allocation request in response to the random value being less than the allocation probability value.

24. A method comprising:
  assigning a priority level to a cache allocation request for a cache memory;
  determining a consumption of the cache memory for the priority level;
  updating an allocation probability based on the consumption of the cache memory and a consumption limit associated with the priority level;
  determining probabilistically that a limited fill is to be performed based on the allocation probability; and
  performing a limited fill in response to determining probabilistically that the limited fill is to be performed.

25. The method of claim 24, wherein determining a consumption of the cache memory for the priority level comprises determining a utilization percentage associated with the priority level of a sample group of lines of a number of lines in the cache memory.

26. The method of claim 24, wherein updating an allocation probability based on the consumption of the cache memory and a consumption limit associated with the priority level comprises comparing the utilization percentage associated with the priority level to the consumption limit associated with the priority level, increasing the allocation probability in response to the utilization percentage being less than the allocation probability, and decreasing the allocation probability in response to the utilization percentage being greater than the allocation probability.

27. The method of claim 24, wherein determining probabilistically that a limited fill is to be performed based on the allocation probability comprises generating a random value, comparing the random value to the allocation probability, performing a normal fill in response to the random value being less than the allocation probability, and performing the limited fill in response to determining the random value is grater than the allocation probability.

28. The system of claim 24, wherein performing a limited fill comprises performing a limited fill action selected from the group consisting of not updating a Last Recently Used (LRU) state of a line of the cache memory upon filling the line, not updating a LRU state of a line of the cache memory upon a subsequent hit to the line of the cache memory, and performing a fill to a limited portion of the cache memory.

* * * * *